United States Patent [19]

Klinner

[11] Patent Number: 4,843,806
[45] Date of Patent: * Jul. 4, 1989

[54] CROP HARVESTING APPARATUS AND METHODS

[75] Inventor: Wilfred E. Klinner, Woburn Sands, United Kingdom

[73] Assignee: National Research Development Corporation, London, England

[ * ] Notice: The portion of the term of this patent subsequent to Dec. 13, 2005 has been disclaimed.

[21] Appl. No.: 35,909

[22] Filed: Apr. 8, 1987

Related U.S. Application Data

[63] Continuation-in-part of Ser. No. 879,109, May 27, 1986, Pat. No. 4,790,128.

[30] Foreign Application Priority Data

Sep. 27, 1984 [GB] United Kingdom ................ 8424395
Apr. 9, 1986 [GB] United Kingdom ................ 8608585

[51] Int. Cl.⁴ ..................... A01D 82/00; A01D 65/02; A01D 89/00
[52] U.S. Cl. .................................. 56/364; 56/DIG. 1
[58] Field of Search ..................... 56/364, 400, 400.21, 56/DIG. 1

[56] References Cited

U.S. PATENT DOCUMENTS

| | | | |
|---|---|---|---|
| 1,100,323 | 6/1914 | Ovans | 56/400.21 |
| 1,343,884 | 6/1920 | Hamilton | 56/130 |
| 1,343,933 | 6/1920 | Hamilton | 56/130 |
| 1,418,542 | 6/1922 | Dill | 56/14.9 |
| 1,660,554 | 2/1928 | Friffith | 56/56 |
| 3,184,905 | 5/1965 | Hillier | 56/364 |
| 4,021,995 | 5/1977 | Hill | 56/DIG. 1 |
| 4,061,284 | 12/1977 | Raisbeck et al. | 241/294 |
| 4,512,146 | 4/1985 | Klinner | 56/400 |
| 4,578,937 | 4/1986 | West | 56/364 |
| 4,581,880 | 4/1986 | Klinner | 56/364 |
| 4,597,282 | 7/1986 | Wilhamies | 56/364 |

FOREIGN PATENT DOCUMENTS

| | | |
|---|---|---|
| 2003770 | 3/1972 | Australia . |
| 83/13636 | 2/1986 | Australia . |
| 937798 | 1/1956 | Fed. Rep. of Germany . |
| 1028821 | 4/1958 | Fed. Rep. of Germany . |
| 1138574 | 10/1962 | Fed. Rep. of Germany . |
| 0094036 | 11/1983 | Fed. Rep. of Germany . |
| 0162431 | 11/1985 | Fed. Rep. of Germany . |
| 994505 | 11/1951 | France ................... 56/130 |
| 2466946 | 4/1981 | France . |
| 976171 | 11/1964 | United Kingdom . |
| 1432119 | 4/1976 | United Kingdom . |
| 1447320 | 8/1976 | United Kingdom . |
| 2000952 | 1/1979 | United Kingdom . |
| 1591187 | 6/1981 | United Kingdom . |
| A2176685 | 1/1987 | United Kingdom . |

Primary Examiner—Paul J. Hirsch
Attorney, Agent, or Firm—Cushman, Darby & Cushman

[57] ABSTRACT

In a row crop harvester a rotor 11 has rows of crop engaging elements 15 extending transversely across the direction of forward travel of the machine, the elements being aligned with the rows to be harvested. Each element has inwardly converging side edges for gathering the crop of a row and for detaching required crop parts which are impelled in a high-speed stream upwardly and rearwardly over the rotor beneath a hood 18. At the junction of each inwardly converging pair of edges a space 21 is provided for stripping crop and releasing stripped stems. Preferably the space 21 is a relief space having re-entrant edges 20 for stripping forwardly facing parts of the crop.

4 Claims, 20 Drawing Sheets

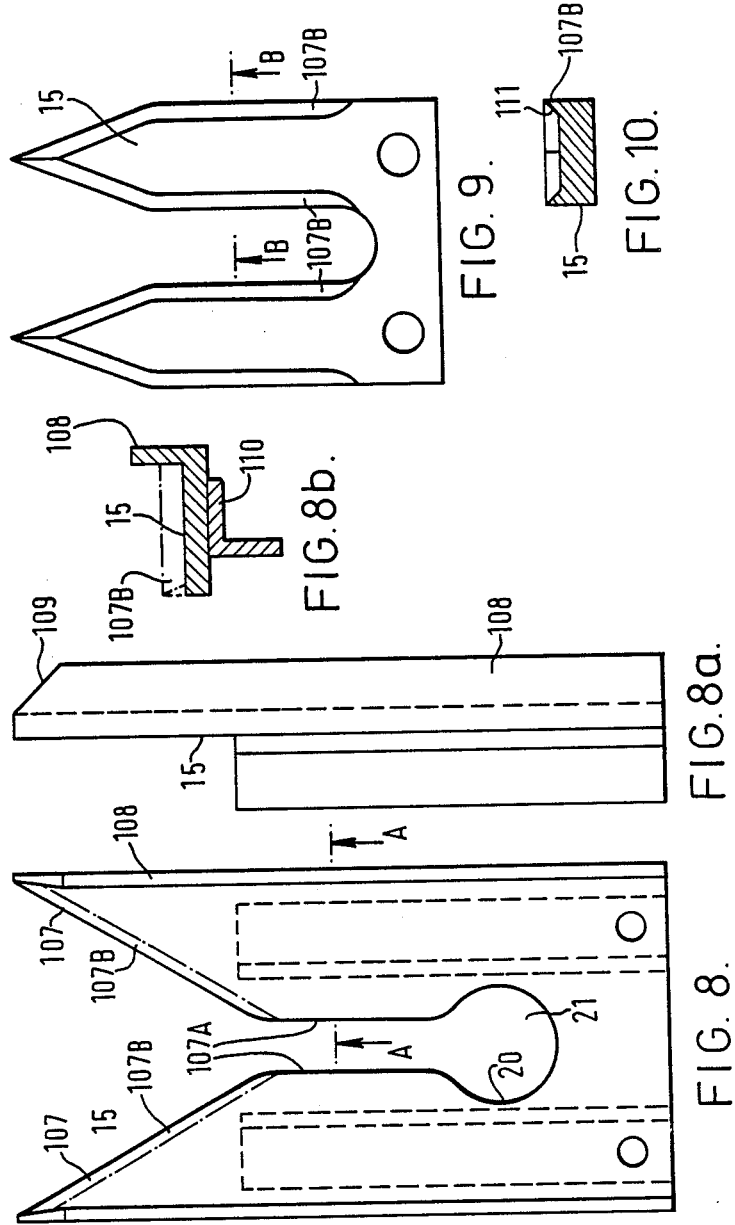

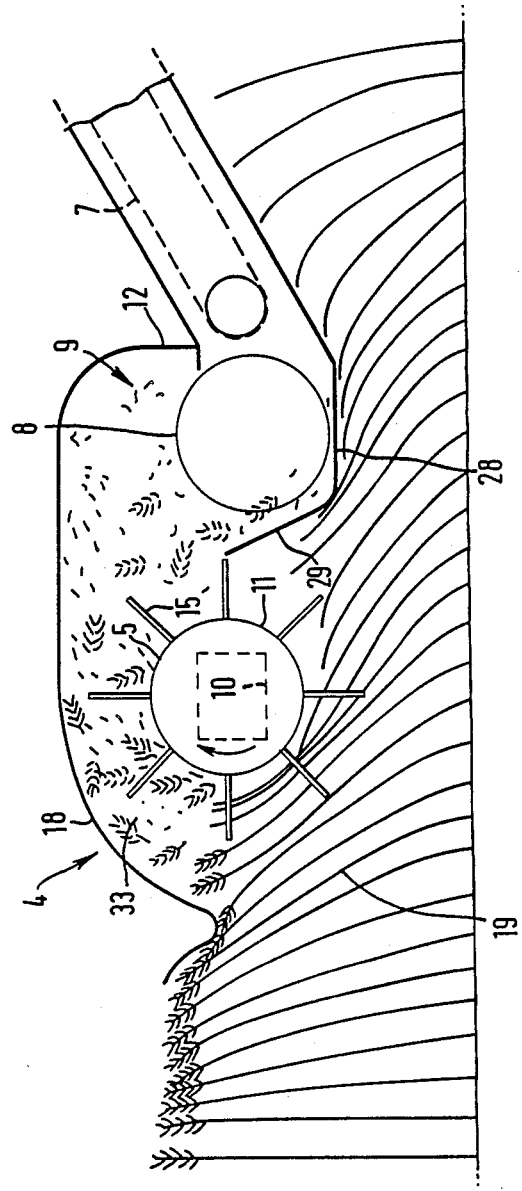

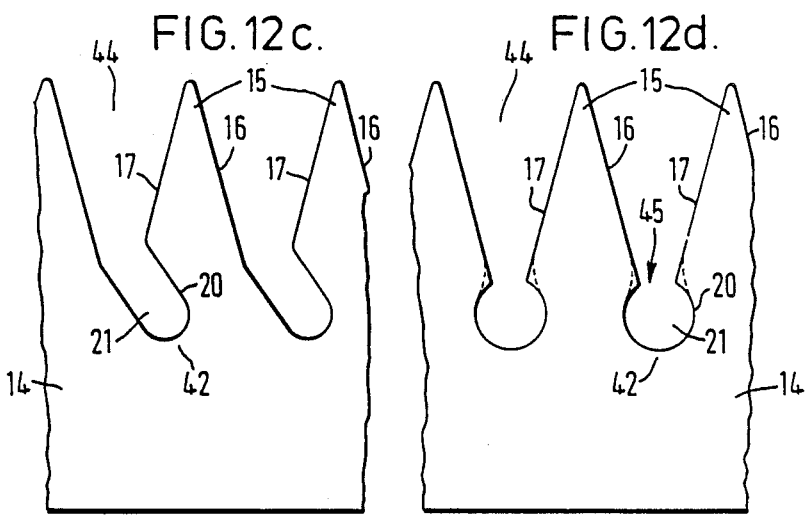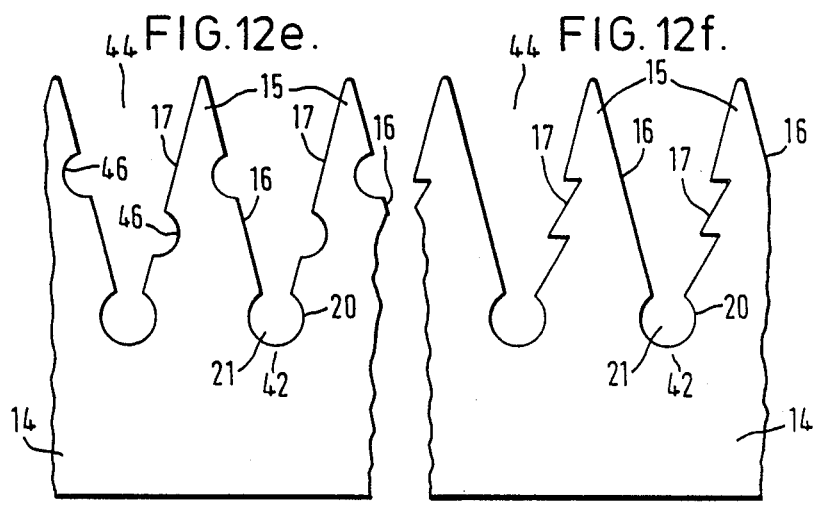

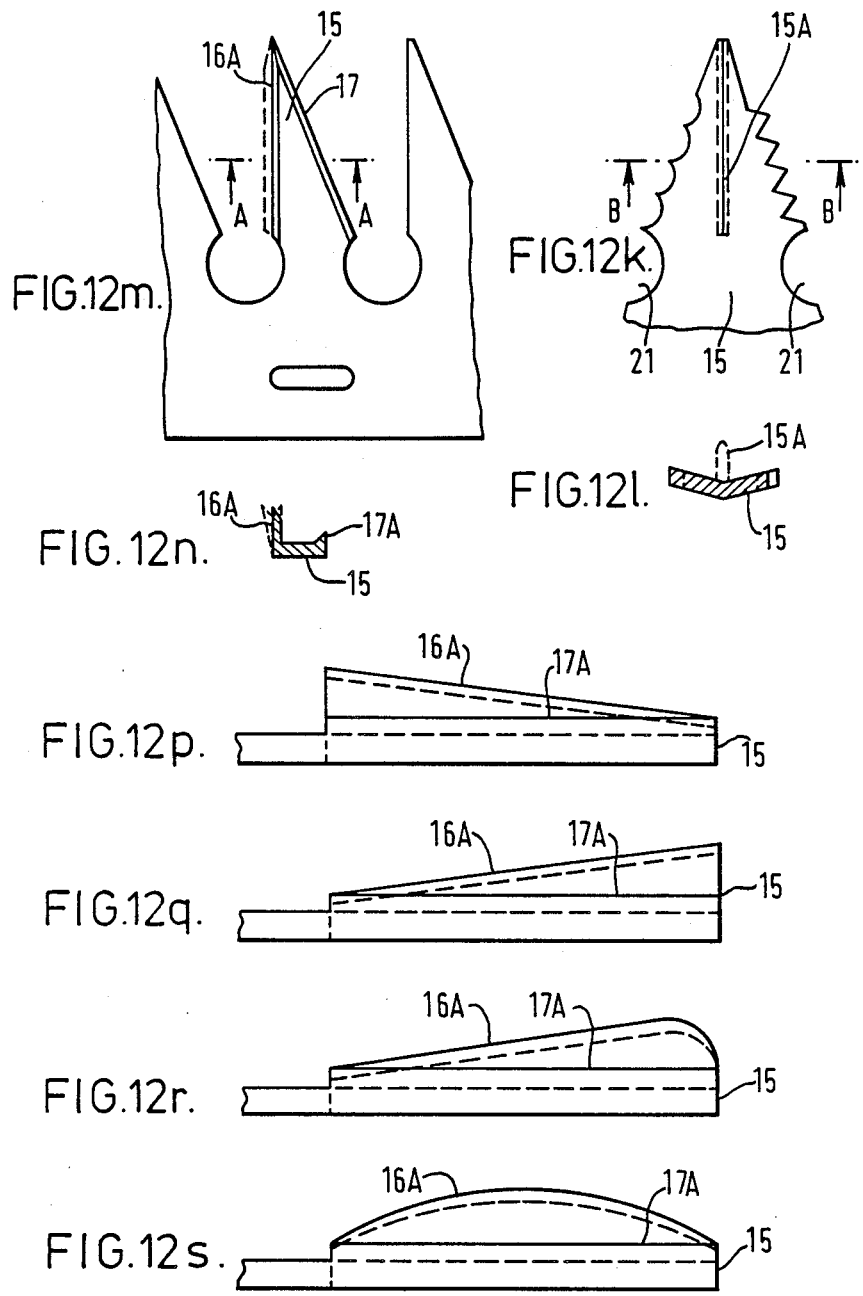

CROP HARVESTING APPARATUS AND METHODS

This Application is a continuation in part of U.S. Application Ser. No. 879,109 filed 05-27-86, now U.S. Pat. No. 4790128.

The present invention relates to apparatus for, and methods of, harvesting crop. The invention is concerned with detaching from the stems or other plant parts of standing crop, seeds, seed-bearing parts, leaves, twigs, flowers, or other predetermined required portion of the crop, collecting the required portion, and leaving the remaining stripped parts of the crop standing in the field. [The invention has particular but not exclusive application in the harvesting of grain crops, such as wheat, oats, barley, and rice.] The invention [also] has application in the stripping of leaves, young shoots, and sometimes blossom from crops. Examples include [lucerne (alfalfa) leaves for protein production, and] the leaves and flowers of herbs and other crops used for the extraction of essential oils and other constituents.

It is an object of the present invention to provide improved apparatus for and methods of stripping required parts from a standing crop, usually the most valuable parts of the crop, namely the seed, leaves, and/or flowers. It is an object of the invention to overcome many of the disadvantages of known harvesting methods and devices, and to simplify, hasten and make less expensive the harvesting process.

According to the present invention in a first aspect there is provided apparatus for harvesting crop from rows of crops comprising a mobile frame for movement over the ground along a crop row, moveable support means mounted for driven movement relative to the frame, a plurality of outwardly projecting crop engaging elements mounted on the moveable support means, guide means for co-operating with the crop engaging elements to form a crop flow passage, and drive means for driving the moveable support means to carry the elements upwardly at a front region of the apparatus so as to detach from standing crop predetermined required parts of the crop and to move the detached crop parts along the crop flow passage, the crop engaging elements being arranged to project forwardly when engaging standing crop and being adapted to be aligned in operation with the crop rows being harvested, each element having a pair of inwardly converging edges for gathering crop of a row and a transverse surface for moving the detached crop parts along the crop flow passage.

The invention encompasses apparatus for detaching from the stems or other plant parts of standing crop, seeds, seed-bearing parts, leaves, twigs, flowers and/or other predetermined required parts of the crop, by rubbing and/or breaking and/or tearing the parts from the stems.

By the term standing crop is meant crop in the field before any harvesting operation has been carried out on it, for example before any cutting operation, and the term standing crop includes crop which may be laid, leaning, or twisted, as well as upright crop.

By a transverse surface is meant a surface which lies substantially in a plane which extends principally transverse to the direction of movement of the element. The plane of the surface may conveniently be substantially flat, but in some arrangements may be curved, preferably slightly concave.

Preferably the apparatus includes laterally spaced apart crop row dividers mounted on the mobile frame and protruding forwardly for entering between crop rows.

In accordance with a particularly preferred feature of the invention, there is provided at the junction of said inwardly converging edges a space for allowing stripped remaining crop parts to be released from the elements and/or for providing edges of the elements adapted to strip required parts from the crop.

In some arrangements each element includes at the junction of the said inwardly converging edges an inwardly extending slot aligned along the general direction of forward movement of the apparatus.

In a particularly preferred form the said inwardly converging edges lead to a relief space having edges which diverge from each other in the direction away from the distal tips of the elements. Preferably the said relief space is formed directly between the inwardly converging edges by re-entrant edges leading away from the inwardly converging edges. Alternatively a said relief space is formed at the end of the said inwardly extending slot. In some arrangements more then one relief space is provided in the region between the inwardly converging edges.

It is a particularly preferred feature of the invention that the edges of the relief spaces are adapted to detach crop parts from regions of the standing crop which face forwardly relative to the intended direction of movement of the apparatus.

In preferred constructions of the invention, at least some of the crop engaging elements have re-entrant edges.

Another preferred feature of the invention is that the outer sides of the elements are substantially parallel to the intended direction of forward movement of the machine along the crop row. In some preferred forms at least some of the edges of the elements has a raised, ramp-shaped lip leading from the said transverse surface. Also in preferred forms each outer side of the elements has an inclined wing protruding forwardly relative to the direction of movement of the element through the crop, and inclined to the said transverse surface.

Preferably the drive means is arranged to drive the crop stripping elements at a speed such that detached crop parts are impelled along the crop flow passage and do not reside to any substantial extent on the moving elements.

Preferably the drive means is arranged to drive the crop stripping elements at a tip speed greater than 5 m/s, most preferably at a tip speed in the range 5 to 15 m/s.

Preferably the crop stripping elements are resiliently mounted, and/or made of flexible resilient material. Preferably the guide means comprises a cover extending around at least part of the region at which the crop engaging elements move at the front region of the apparatus. Preferably each said transverse surface for impelling detached crop parts along the crop flow passage is substantially flat.

Preferably the said moveable support means comprises a rotor, but may alternatively comprise an endless conveyor.

In some arrangements the crop engaging elements are arranged in rows transverse to the direction of forward movement of the apparatus. Preferably the said crop stripping elements are arranged with succeeding elements along the support means in register with one another.

There is also provided in accordance with the present invention a method of harvesting crop from rows of crops comprising moving along a crop row through a standing crop a harvesting apparatus, moving upwardly at a front region of the apparatus a plurality of outwardly projecting crop engaging elements, engaging the standing crop by the moving elements when projecting forwardly relative to the direction of movement of the apparatus, detaching from standing crop predetermined required parts of the crop, conveying the detached crop parts along a crop flow passage by transverse surfaces of crop engaging elements, and collecting the detached crop parts, the method including the steps of engaging the crop by elements which are aligned in operation with the crop rows being harvested, gathering the crop of a row between inwardly converging edges of crop engaging elements, stripping crop parts by the elements, and moving the detached crop parts along the crop flow passage by transverse surfaces of the elements.

It is a feature of the present invention that the crop engaging elements are preferably moved at a relatively high speed. A number of criteria can be used to establish the required high speed, for example the speed of movement of the crop engaging elements relative to the frame will normally be set to be substantially greater than the forward speed of movement of the frame, and set at a speed such as to propel the stripped material in a fast moving stream along the crop flow passage defined between the guide means and the crop engaging elements. Preferably the tip speed of the crop engaging elements is greater than 5 m/s, conveniently within the approximate range 5 to 15 m/s. The forward speed of the frame may be in a range up to 15 km/hour, preferably in the range 3 to 9 km/hour.

A distinction of row crops from cereal crops is, for example, that the row spacing is very much greater, and that row crops have stems several times the diameter of cereal crops. For cereals the spacing might be 125 to 175 mm, and for row crops the spacing might be 200 to 750 mm. The stem diameter for cereals might be 3 to 6 mm. The stem diameter for row crops might be 8 to 40 mm. Row crops grow very much taller, for example 2 m or more. Another difference is that often the material being harvested, for example cobs, occurs relatively low down the stem, whereas with cereal crops the material being harvested is all positioned at the head of the crop. Examples of row crops include maize, sorghum, oil seed rape, and field beans.

Embodiments of the invention will now be described by way of example with reference to the accompanying drawings in which.

Figure 5:
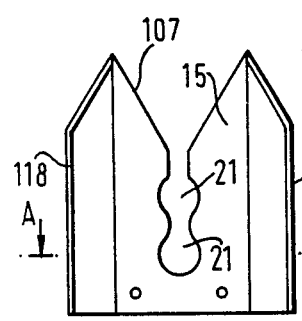
Figure 6:
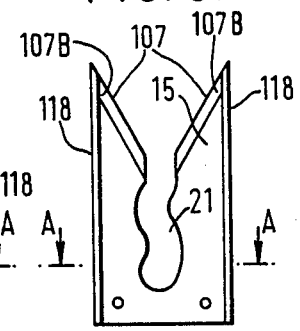
Figure 7:
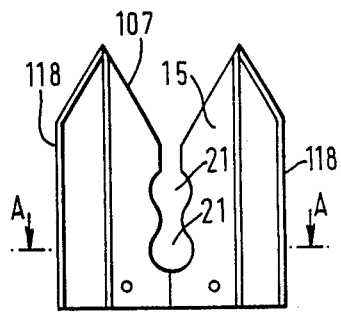

FIGS. 5, 6 and 7 show three forms of crop engaging element which may be used in the apparatus of FIG. 1 and FIGS. 5(a), 6(a) and 7(a), show respective sections along lines AA in FIGS. 5, 6 and 7;

FIGS. 8 and 8(a) show respectively diagrammatic plan and side views of a preferred form of crop stripper element which may be used in a row crop harvester embodying the invention, and FIG. 8(b) shows a sectional view of a support member for the element of one half of the crop stripper element and a support member for the element, in the direction of arrows AA in FIG. 8;

FIGS. 9 and 10 show respectively diagrammatic plan and sectional views of a further version of the element shown in FIG. 8.

Figure 1:
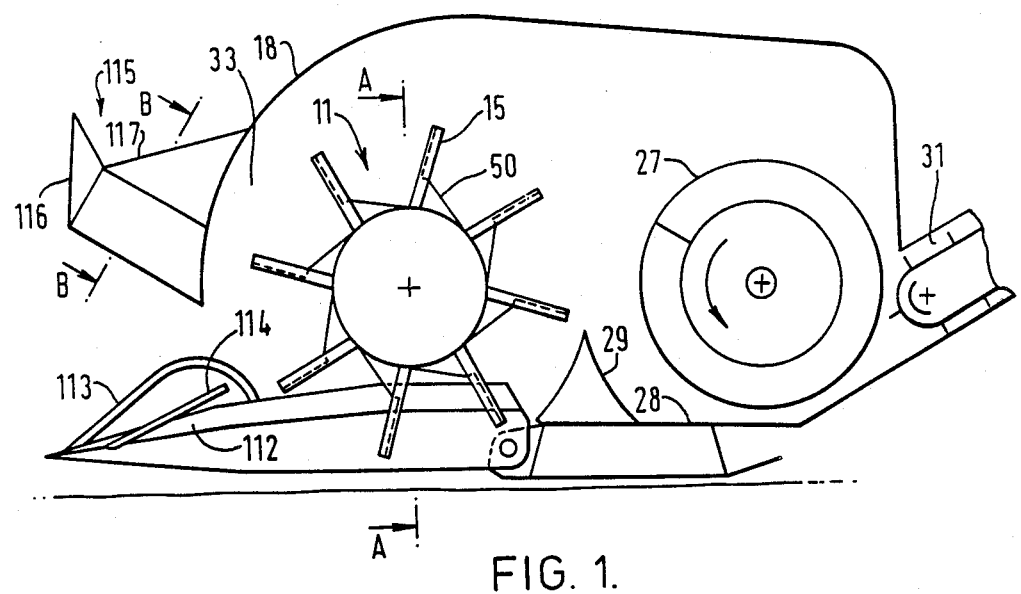
FIG. 1 is a diagrammatic side view in section of a crop row harvester embodying the invention.

Referring to FIG. 1 the apparatus comprises a mobile frame 12 on which is mounted a moveable support means which in the example shown is a rotor 11, carrying outwardly projecting crop engaging elements 15. The rotor 11 is driven in the so-called overshot mode so that the crop engaging elements 15 are moved in an upward direction at the front of the apparatus. Guide means co-operate with the crop engaging elements 15 to form a crop flow passage 33. In the example shown, the guide means are constituted by a hood or cover 18 which extends around at least part of the front half of the rotor and defines with the rotor elements 15 the crop flow passage 33 along which crop is conveyed by the rotor. The hood or cover 18 prevents forward projection of parts of the crop detached by the rotor 11.

In operation, rotation of the rotor 11 moves the crop engaging elements 15 so that the elements gather the crop and then move upwardly through the crop, gathering one or more crop stems. As the elements 15 reach the seed or fruit bearing parts of the crop the required parts to be detached are detached by rubbing and/or breaking and/or tearing the parts from the stems.

After the detachment, the required crop parts are conveyed upwardly and rearwardly over the rotor 11, and pass to crop conveying means positioned within a collecting trough 28 having a front wall 29 in close proximity to the rear of the rotor 11. Usually the crop transfer means will include means for transferring crop laterally, e.g., an auger 27, and means for conveying the crop rearwardly, e.g., a slatted chain conveyor 31.

Figure 4:
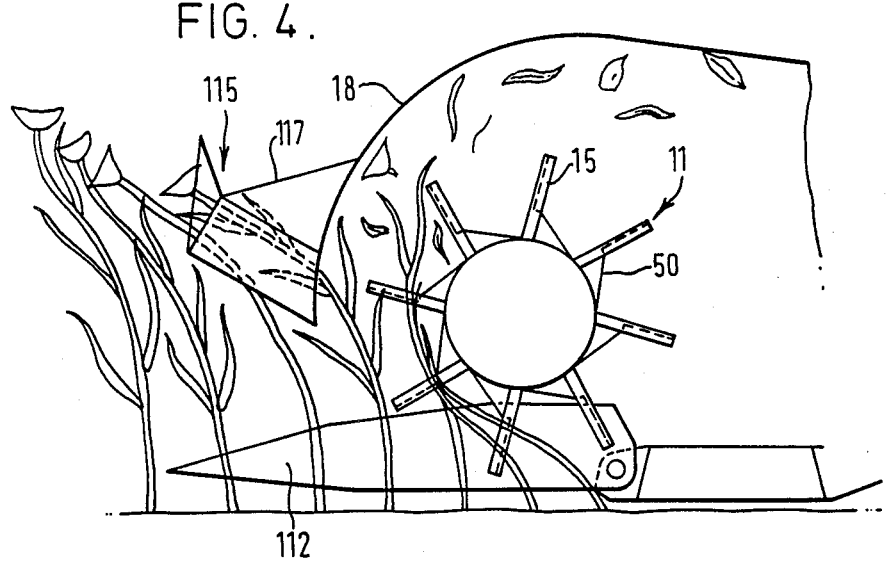
FIG. 4 shows in diagrammatic side view a front part of the apparatus of FIG. 1, when in operation.

FIG. 4 shows the apparatus of FIG. 1 in operation, and illustrates the sequence of guiding and stripping a row crop resembling a hybrid between maize and sunflowers. For such crops the stripping rotor diameter may be in excess of 1 m and that the number of transverse rows of stripping elements can be greater than the eight shown. The dimensions of the stripping elements may be adapted to suit specific applications, particularly the element length, the width to length ratio, the angle of the crop engaging edges, and the size and inclination of wings which may be provided along the outer sides of the elements.

Figure 2:
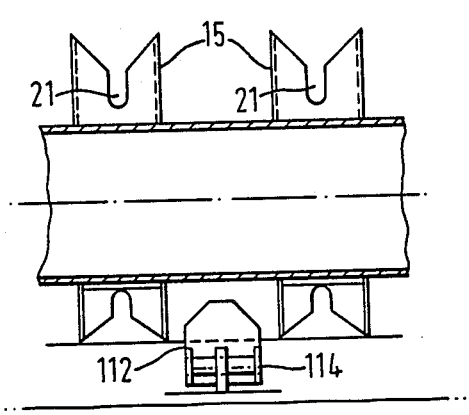
FIG. 2 is a front, part-sectional view of the crop row harvester shown in the direction of arrows AA in FIG. 1.

With reference to FIG. 2, there is provision for the lateral spacing of the stripping elements on the rotor core to be adjustable, to adapt the rotor quickly and easily to different crops. For example, the elements may be located in transverse channels with provision for clamping or locking them in position. Moreover, the circumferential position of elements covering adjacent crop rows may be offset, so that the drive torque characteristic of the stripping rotor is smoothed out. That is to say, that the elements need not be positioned in straight rows parallel to the axis of rotation of the rotor.

Section AA of FIG. 1 is shown in FIG. 2 and indicates that the elements 15 are laterally spaced apart to coincide with the row spacing of the crop. Between sets of circumferentially aligned stripping elements 15 there is provided hingedly attached to the front of the harvester table a divider assembly 112 which protrudes forwardly into the spaces between crop rows. The dividers 112 have the purpose of deflecting upwardly and sideways any crop stems or parts which are misaligned in respect to the stripping elements 15. It is arranged that the stripping rotor 11 and hood 18 can be raised and lowered independently of such dividers 112 above a minimum setting.

Figure 3:
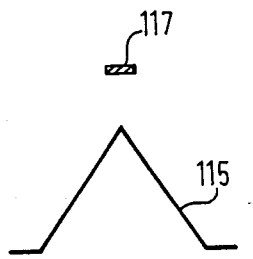
FIG. 3 is a diagrammatic representation of a crop guide shown in FIG. 1 in the direction of arrows BB in FIG. 1.

As shown in FIG. 2, there may optionally be attached to the main body of the crop divider 112 a central, upwardly projecting bow divider 113. At the sides are rearwardly and upwardly extending crop guides 114, which may be provided with angular adjustment. Attached to the front of the lower hood section 18 are optional upper crop guides 115 whose lateral spacing also coincides with the row spacing. At the front of also coincides with the row spacing. At the front of each upper crop guide 115 is a flared intake section 116. The apex of the cross-sectional shape of an upper guide 115 lies on the vertical plane which passes through the centre of the recesses 21 in the stripping elements 15. FIG. 3 shows a section through the upper crop guide 115 in the direction of arrows BB in FIG. 1. A support strut 117 above the upper crop guide 115 may be designed to adjust the inclination of the guide 115.

It should be noted that the crop dividers can take many forms and may be pivoted or suspended in many different ways. They may be provided themselves with ground-engaging skids.

Figure 5A:
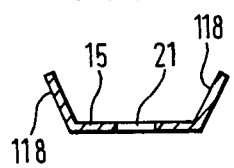

In FIGS. 5 and 5(a) is shown a stripping element 15 for row crops which produce large fruiting bodies or seed heads, or a large bulk of foliage needing to be detached. To accommodate the crop bulk and minimise the risk of loss, a large flared wing 118, set at a suitable angle to the horizontal, is provided on each side. The central recess can have more than one relief aperture 21, to ensure stripping of wanted crop parts from the "sheltered" stem region and to cause lateral "agitation".

Figure 6A:
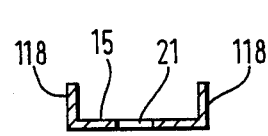

In FIGS. 6 and 6(a) is shown a row crop stripping element 15, also of large dimension but with wings 118 which are perpendicular to the plane of the element 15 and may be dimensioned to meet the requirements of specific crops. Converging crop-engaging edges 107 are provided with a ramp-shaped lip 107B (not shown in cross-section, but similar to that shown at 107B in FIG. 10), to increase the upward angle of the trajectory of detached crop parts on leaving the element under centrifugal effect. The central recess 21 is shaped to be wavy, to impart a lateral agitation to the crop stems and at the same time provide re-entrant edges for more complete stripping.

Figure 7A:
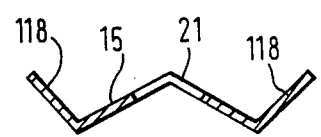
Figure 11B:
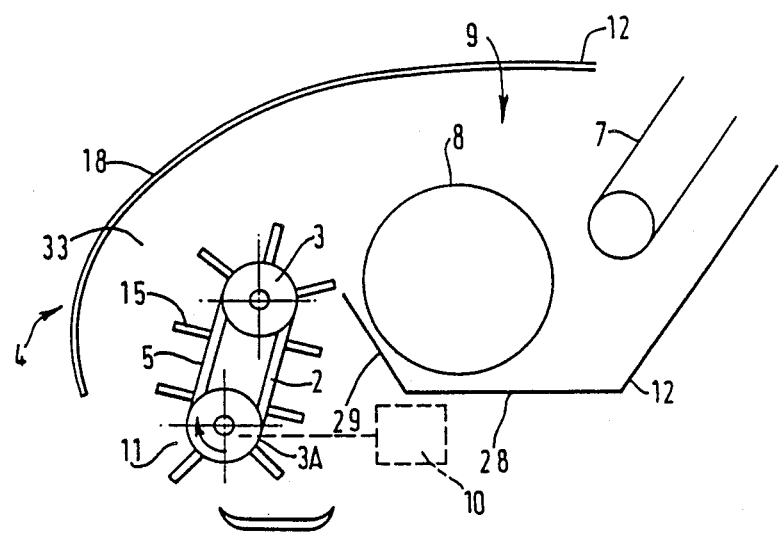
Figure 11C:
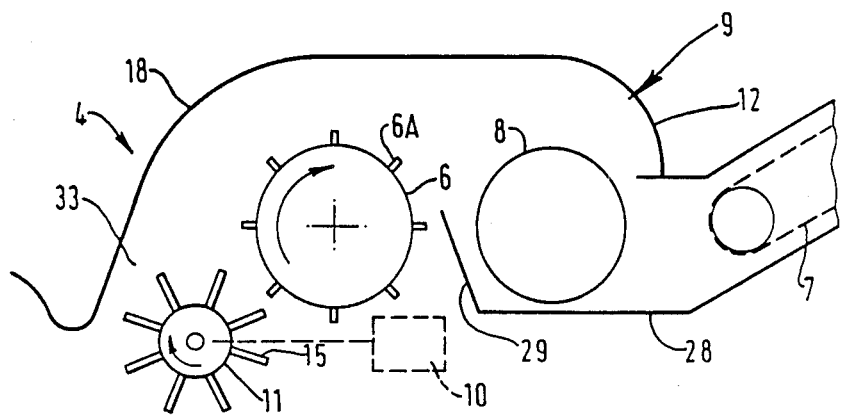
Figure 12A:
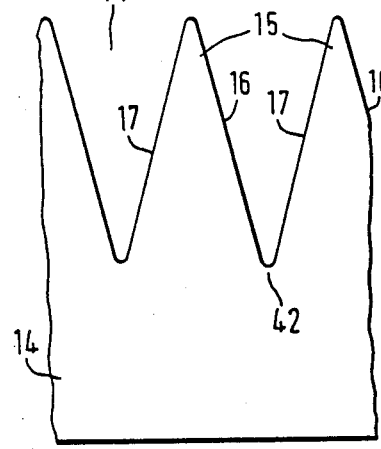
Figure 12B:
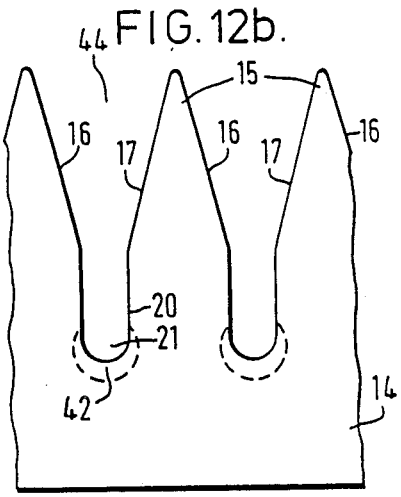
Figure 12G:
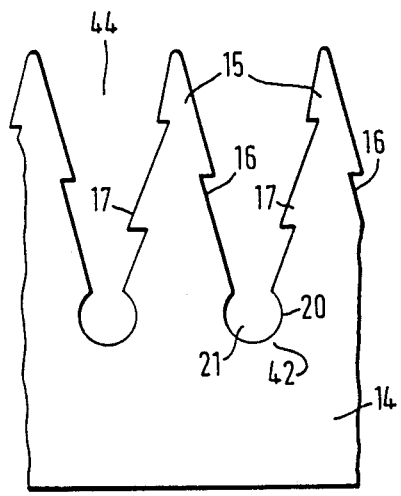
Figure 12H:
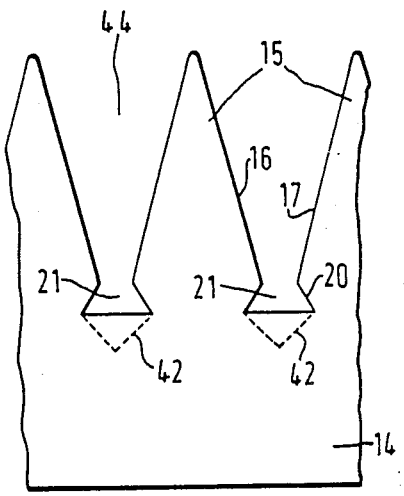
Figure 13C:
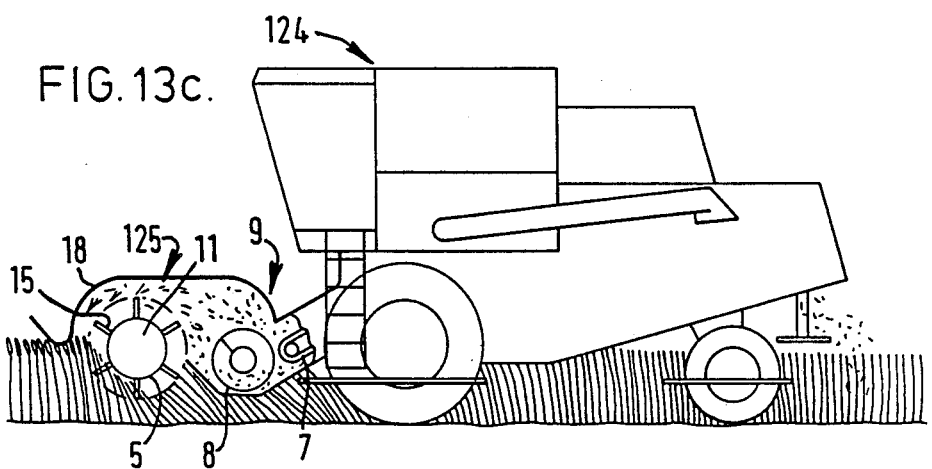
Figure 12J:
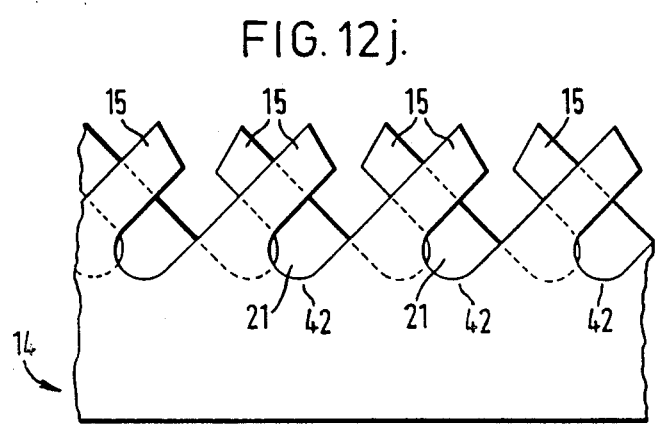
Figure 13A:
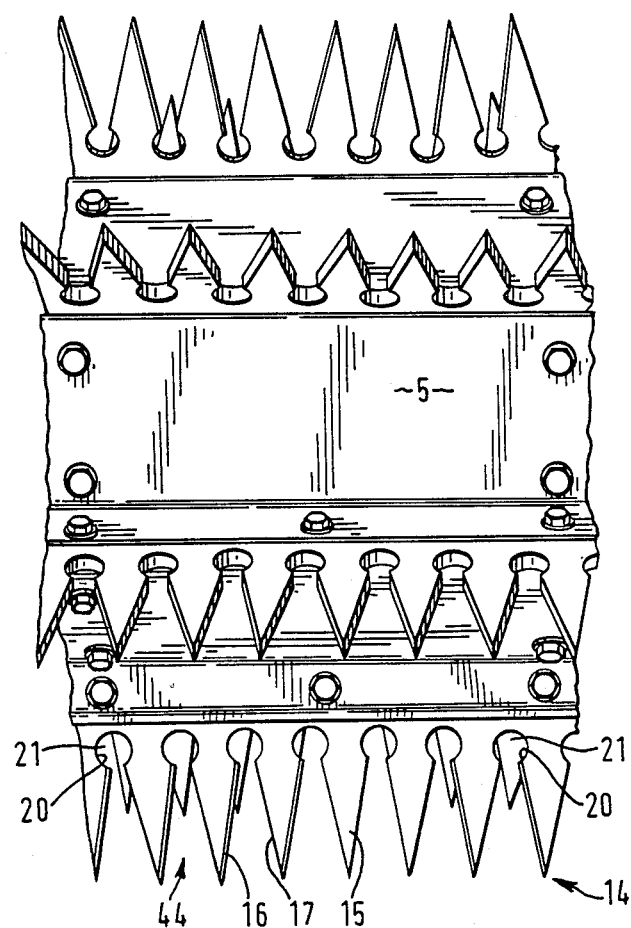
Figure 13B:
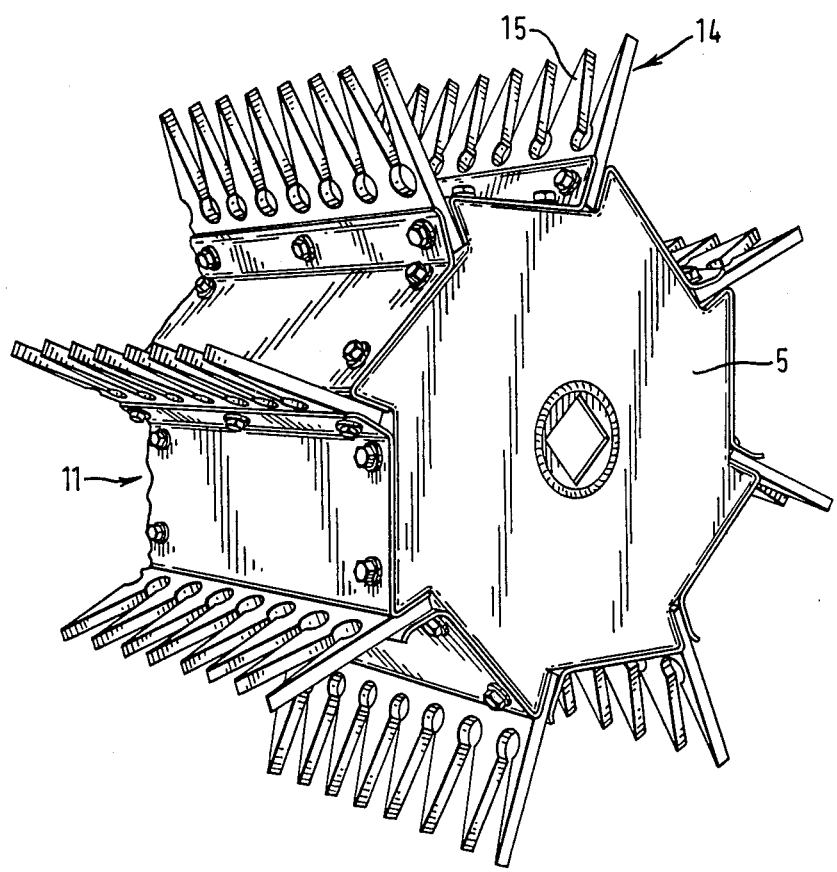
Figure 13B:
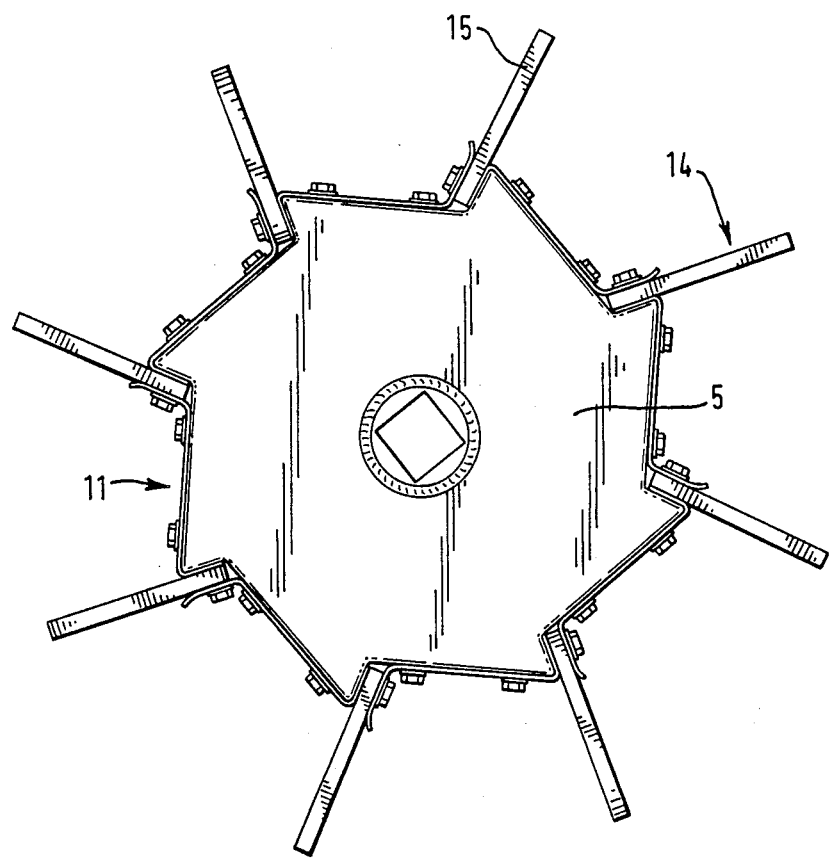
Figure 13D:
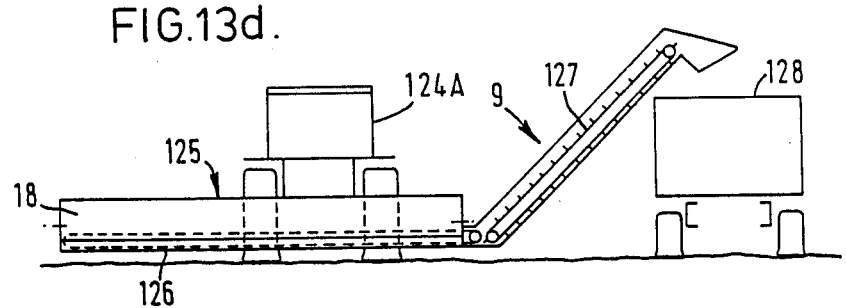
Figure 13E:
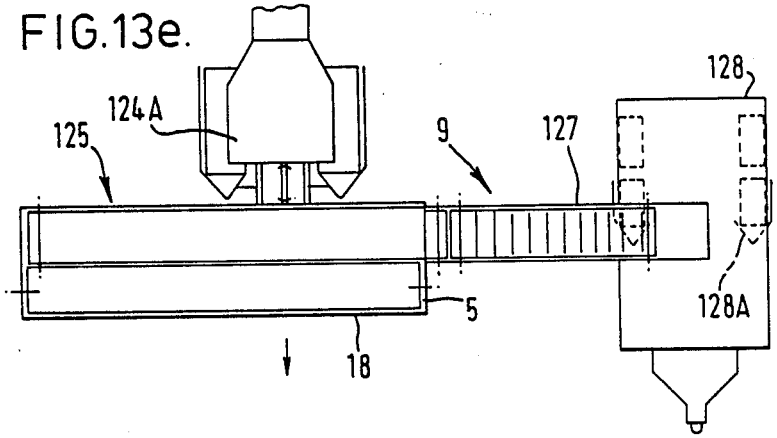
Figure 13F:
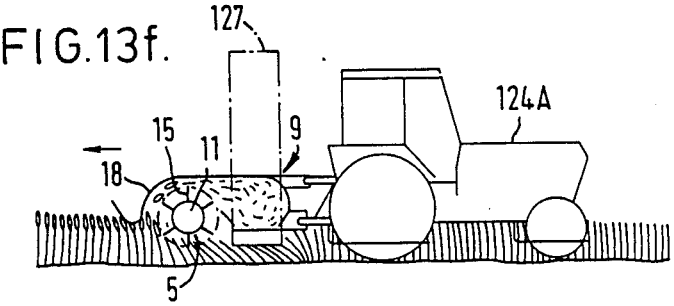
Figure 14:
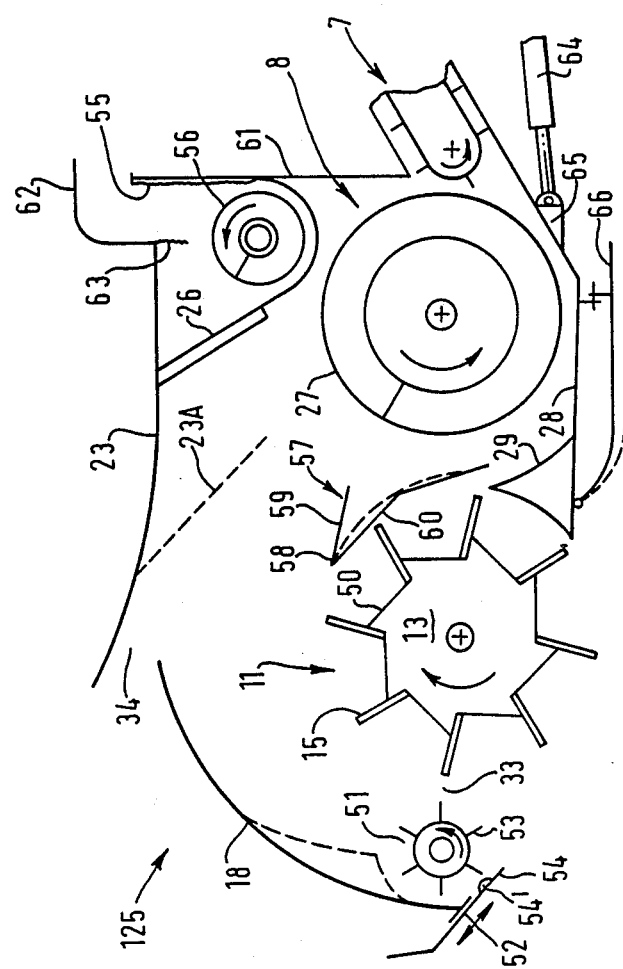
Figure 14A:
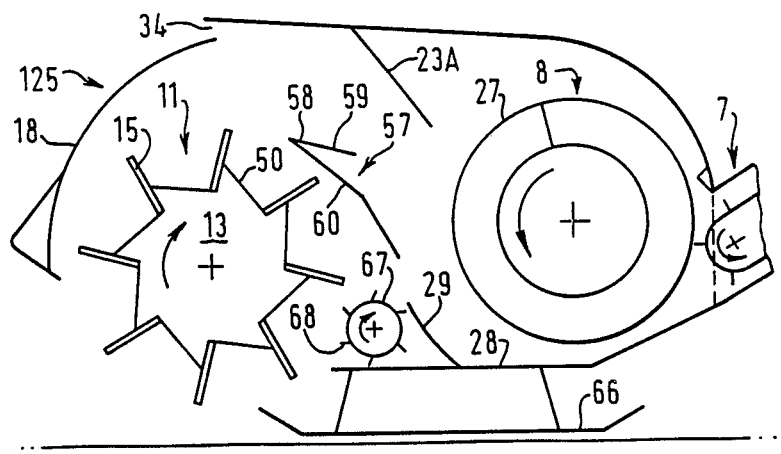
Figure 15:
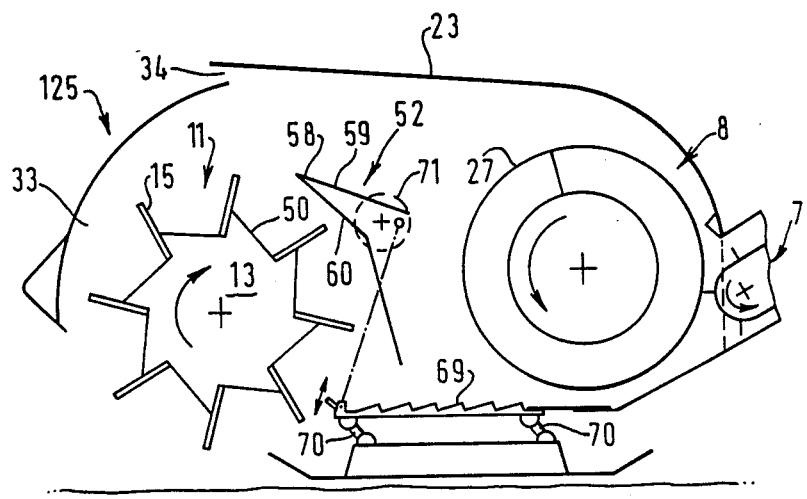
Figure 16:
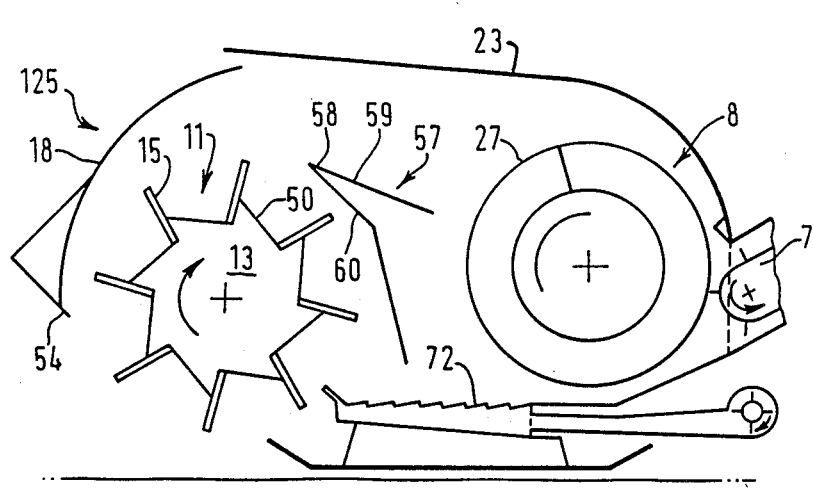
Figure 17:
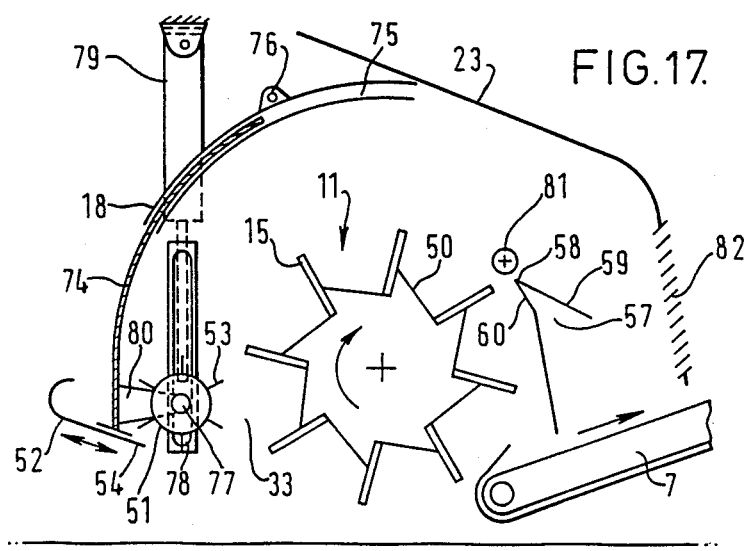
Figure 18:
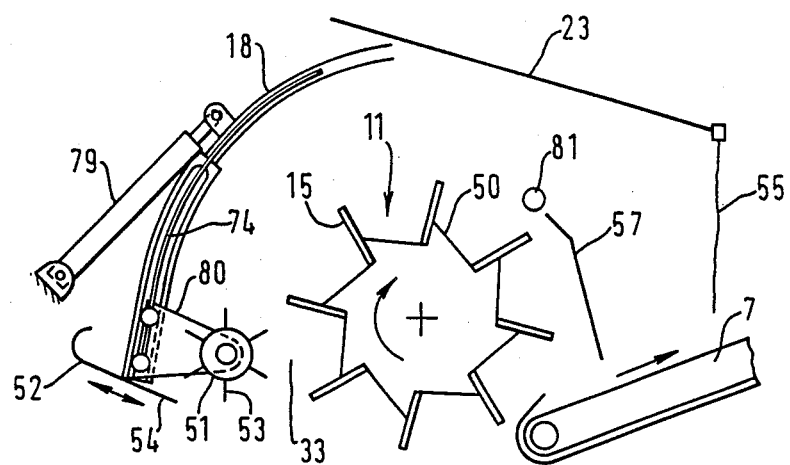
Figures 19, 19A:
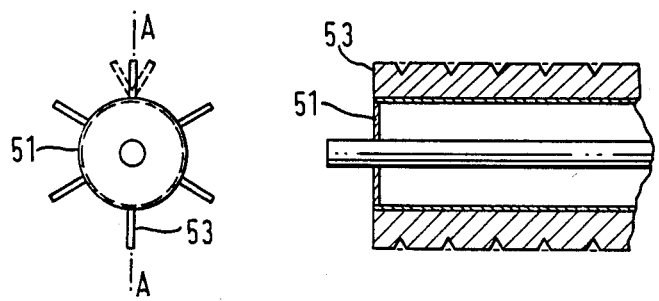
Figure 23:
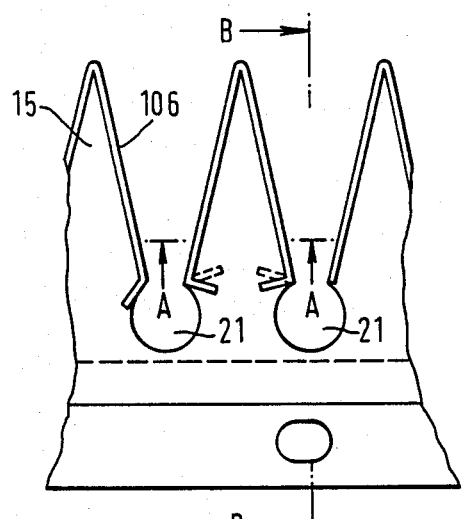
Figure 24:
Figure 25:
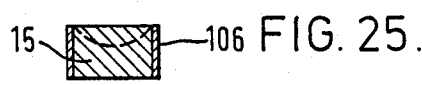
Figure 20:
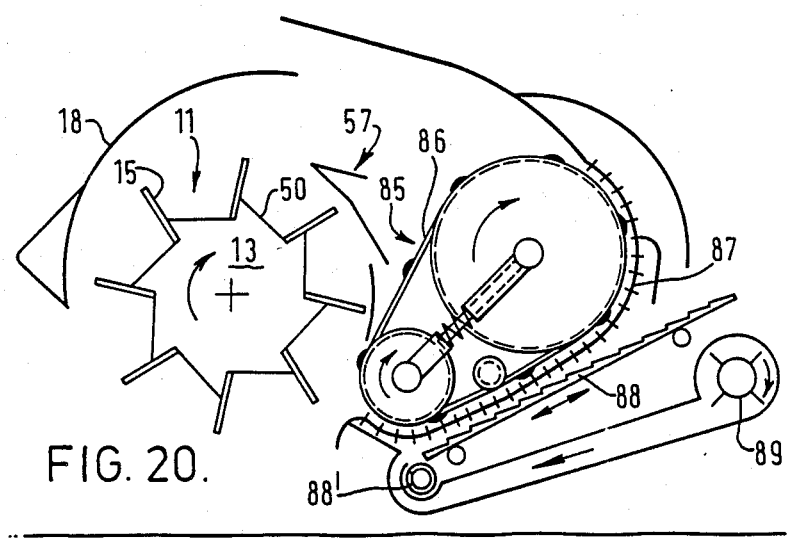
Figure 21:
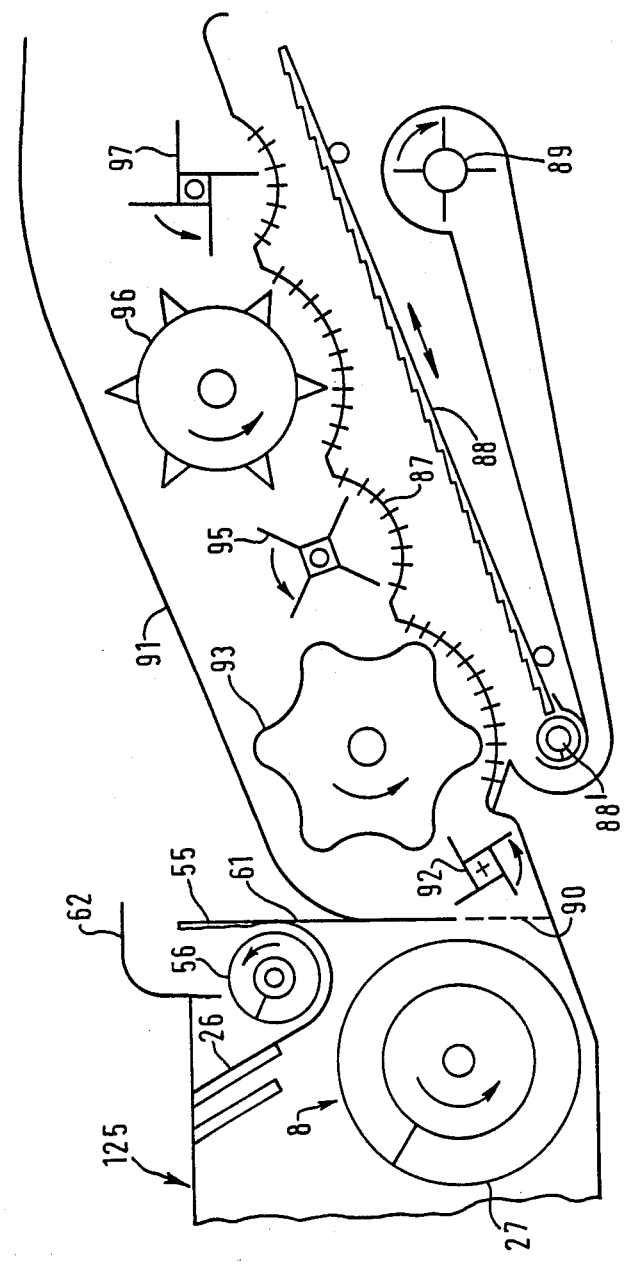
Figure 22:
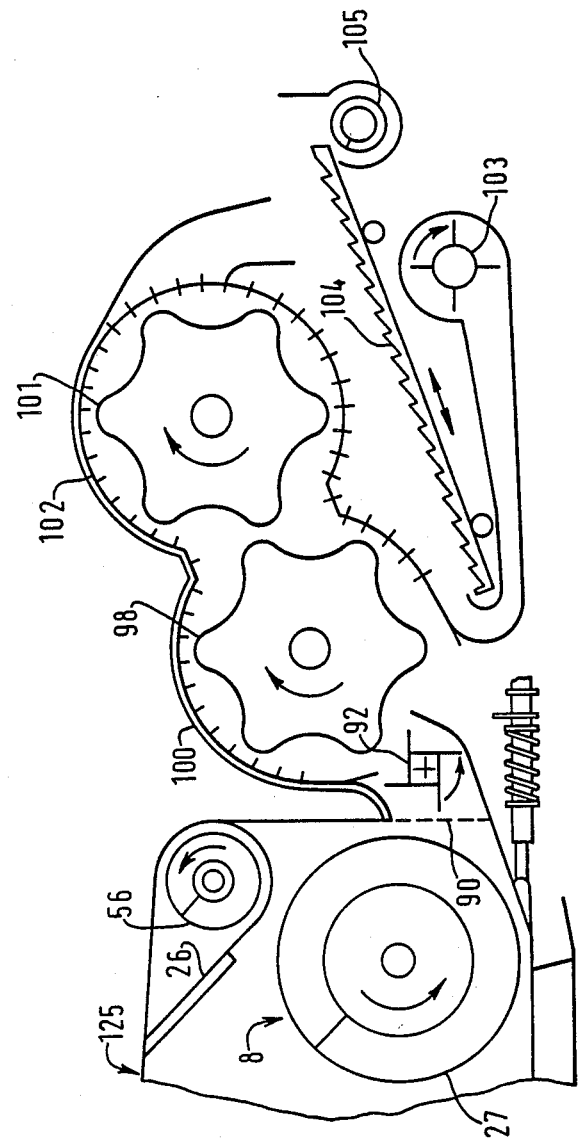

FIGS. 7 and 7(a) show further modifications of the element of FIG. 5, in which the central transverse surfaces of the element 15 are inclined upwardly at the centre, that is to say forwardly relative to the direction of movement of the element through the crop.

FIGS. 8 to 10 show further modified forms of crop stripping elements which may be used.

FIG. 8 shows large stripper paddles 15 which may be up to 300 mm in overall length, or even longer for specific purposes and crops. The paddles 15 form a pronounced flared entry region by edges 107, so as to guide for example row crops into a subsequent narrower stripping section bounded by edges 107A, which is followed optionally by a relief aperture 21 bounded by edges 20 of circular or other shape. As shown in FIG. 8(b), which is a cross-sectional view of arrows AA in FIG. 8, the paddles have pronounced upstanding ribs 108 at the sides, and optionally at the leading flared edges there may be integral ramp-shaped upward protrusions 107B as shown in FIG. 8. Beneath them, near their working edges, the paddles 15 are supported and strengthened by, for example, angle-section members 110 as shown in FIG. 8(b). At their base the paddles are fastened to suitable brackets, fins or other supporting elements on the rotor core. This form of stripping element finds particular application in the harvesting of such crops as grain maize, sunflowers, Brussels sprouts, sugar beet seed, and other stiff crops with stem cross-sectional dimensions substantially larger than cereal and other small seed crops.

In FIG. 9 is shown a type of stripping element 15 which is particularly suitable for intermediate crops, whether grown in rows or not. Examples of such crops are field beans and oil seed rape. The dimensions of the elements 15 can be adapted to suit specific requirements. Essentially each element 15 forms a small impelling paddle which has an optional raised, ramp-shaped rim 107B surrounding it along the crop-engaging edges. The purpose of the integral ramps 111 is to allow particles to escape freely but to direct them into more steeply inclined trajectories for more positive recovery. This is particularly important in crops which are at the point of shedding and which have seeds or other wanted parts in the lower stem regions. Between adjacent elements there may be optional relief apertures of suitable design. FIG. 10 is a section in the direction of arrows BB in FIG. 9. The slope of the ramp-shaped rim section 108 may be from approximately 15° to 45°, or steeper.

The ramp-shaped edges are provided by additional plastics material which increases the wear resistance in the edge region and causes crop particles leaving the elements under the effect of centrifugal force to be directed into more steeply inclined trajectories for more positive recovery. The edges have particular relevance in the context of moulded stripping elements made from resilient material. The edges are provided for influencing the trajectory of the detached crop parts in the impelling phase of previously collected material. One advantage of the crimped or raised edges, is that by means radially mounted elements may be caused to achieve the effects of forwardly inclined elements.

I claim:

1. Apparatus for harvesting required crop parts from rows of standing crops comprising
a mobile frame for movement over the ground along a crop row, moveable support means mounted for driven movement relative to the frame,
a plurality of outwardly projecting crop engaging elements mounted on the moveable support means,
guide means for co-operating with the crop engaging elements to form a crop flow passage,
drive means for driving the moveable support means to carry the elements upwardly at a front region of the apparatus so as to detach from standing crop predetermined required parts of the crop and to move the detached crop parts along the crop flow passage, the crop engaging elements projecting forwardly for engaging standing crop, and
laterally spaced apart crop row dividers mounted on the mobile frame and protruding forwardly for entering between crop rows, said crop row dividers defining between each cooperating pair of dividers a crop gathering region for gathering together crop of a row, each element having a pair of inwardly converging edges defining a second crop gathering region for gathering together crop of a row, each element having edges defining at the junction of said inwardly converging edges a space for stripping required parts from crop by the edges defining the space, and for allowing stripped remaining crop parts to be released from the elements, each said second crop gathering region defined by said inwardly converging edges of a crop engaging element being aligned with a said first crop gathering region defined between laterally spaced apart crop row dividers, said crop engaging elements having transverse surfaces abutting said inwardly converging edges for impelling detached crop parts along the crop flow passage.

2. Apparatus according to claim 1 in which each element includes at the junction of the said inwardly converging edges an inwardly extending slot aligned along the general direction of forward movement of the apparatus.

3. Apparatus according to claim 1 in which the said inwardly converging edges lead to a relief space having edges which diverge from each other at the entrance to the relief region, the boundaries of the relief region including edges facing away from the distal ends of the crop engaging elements for detaching crop parts from regions of the standing crop which face forwardly relative to the intended direction of movement of the apparatus.

4. Apparatus according to claim 1 in which the outer side of the elements are substantially parallel to the intended direction of forward movement of the apparatus along the crop row, and each outer side of the element has a raised inclined wing which protrudes forwardly relative to the direction of movement of the element by the moveable support means, and is inclined relative to the said transverse surface away from the said crop gathering edges.

* * * * *

UNITED STATES PATENT AND TRADEMARK OFFICE
CERTIFICATE OF CORRECTION

PATENT NO. : 4,843,806
DATED : July 4, 1989
INVENTOR(S) : KLINNER

It is certified that error appears in the above-identified patent and that said Letters Patent is hereby corrected as shown below:

On the title page, "20 Drawing Sheets" should be --3 Drawing Sheets--.

On the title page, in the list of FOREIGN PATENT DOCUMENTS, "0094036 11/1983 Fed. Rep. of Germany" should be --0094036 11/1983 EPO-- and "0162431 11/1985 Fed. Rep. of Germany" should be --0162431 11/1985 EPO--.

On the title page, after "Notice:", "The portion of the term of this patent subsequent to Dec. 13, 2005 has been disclaimed." should be --The portion of the term of this patent subsequent to October 8, 2002 has been disclaimed.--

Figures 11a-25 should be deleted.

Signed and Sealed this

Fifteenth Day of January, 1991

Attest:

HARRY F. MANBECK, JR.

*Attesting Officer*  *Commissioner of Patents and Trademarks*